US012089131B2

(12) United States Patent
Alhammad et al.

(10) Patent No.: US 12,089,131 B2
(45) Date of Patent: Sep. 10, 2024

(54) AUTO-NOTIFICATION AND ESCALATION ENGINE FOR JOURNEY MANAGEMENT

(71) Applicant: SAUDI ARABIAN OIL COMPANY, Dhahran (SA)

(72) Inventors: Faisal Yousef Alhammad, Dammam (SA); Fawaz Kadannam Patta, Dhahran (SA); Hussain M. Alnasser, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 361 days.

(21) Appl. No.: 17/644,808

(22) Filed: Dec. 17, 2021

(65) Prior Publication Data

US 2023/0199459 A1    Jun. 22, 2023

(51) Int. Cl.
*H04W 4/90* (2018.01)
*G06F 16/29* (2019.01)
(Continued)

(52) U.S. Cl.
CPC ............ *H04W 4/90* (2018.02); *G06F 16/29* (2019.01); *G06Q 10/02* (2013.01); *G08G 1/205* (2013.01);
(Continued)

(58) Field of Classification Search
CPC ......... H04M 3/42093; H04M 3/42374; H04M 3/42382; H04M 3/436; H04M 1/663;
(Continued)

(56) References Cited

U.S. PATENT DOCUMENTS 6,621,420 B1 * 9/2003 Poursartip .............. G08G 1/087
340/906
7,312,712 B1 * 12/2007 Worrall .................. G08B 21/02
379/38
(Continued)

FOREIGN PATENT DOCUMENTS

CN    109484410 A    3/2019

OTHER PUBLICATIONS

Kanfade, Mohit M., Sukriya D. Ambade, and Amol P. Bhagat. "Location Based Notification System." 2018 International Conference on Research in Intelligent and Computing in Engineering (RICE). IEEE, 2018. (Year: 2018).*
(Continued)

*Primary Examiner* — Sharad Rampuria
(74) *Attorney, Agent, or Firm* — Osha Bergman Watanabe & Burton LLP

(57) ABSTRACT

A method for journey management is disclosed. The method includes retrieving, from a geographical information system (GIS), journeyer contact information and scheduled check-in time of a journeyer who is dispatched on a journey, determining, based on a current time, a tiered late check-in status of the journeyer with respect to the scheduled check-in time, identifying, based on the tiered late check-in status, a notification entity, retrieving, from the GIS, notification contact information of the notification entity, and sending, based on the journeyer contact information and the notification contact information, an alert to the journeyer and the notification entity.

20 Claims, 7 Drawing Sheets

(51) Int. Cl.
*G06Q 10/02* (2012.01)
*G08G 1/00* (2006.01)
*H04L 51/046* (2022.01)
*H04W 4/029* (2018.01)
*H04W 4/14* (2009.01)

(52) U.S. Cl.
CPC ........... *H04L 51/046* (2013.01); *H04W 4/029* (2018.02); *H04W 4/14* (2013.01)

(58) Field of Classification Search
CPC ....... H04M 2203/651; H04M 2207/18; H04M 2250/60; H04L 51/00; H04L 51/02; H04W 4/12; H04W 4/16; H04W 88/021; H04W 88/18
See application file for complete search history.

(56) References Cited

U.S. PATENT DOCUMENTS

| | | | |
|---|---|---|---|
| 8,195,188 B2* | 6/2012 | Fomukong | H04B 7/18567 455/457 |
| 8,610,599 B2 | 12/2013 | Bevacqua et al. | |
| 9,412,273 B2 | 8/2016 | Ricci | |
| 10,913,464 B1 | 2/2021 | Qiao et al. | |
| 11,765,543 B2* | 9/2023 | Stamm | G06Q 10/1095 701/465 |
| 2011/0047230 A1* | 2/2011 | McGee | H04L 69/40 709/217 |
| 2011/0175724 A1* | 7/2011 | Kent | H04L 67/52 340/539.13 |

OTHER PUBLICATIONS

Qin, Zhongyuan, et al. "An efficient key management scheme based on ECC and AVL tree for large scale wireless sensor networks." International Journal of Distributed Sensor Networks 11.9 (2015): 691498 (Year: 2015).*

"Going on a road trip? There's an app for that" 2021, Internet URL: https://www.aramcolife.com/en/publications/the-arabian-sun/articles/2021/week-26/safe-travel-app (5 pages).

"An end-to-end Journey Management & Risk Assessment Mobile & Web Application" Link: <https://www.onlineprocurement.com.au/wp-content/uploads/2018/06/JMS-Brochure-20181.pdf> (4 pages).

* cited by examiner

Active Journey

| | Status | Driver_ID | Mobile | Vehicle_ID | Type | Actual_Start_Date | Completion_Date | Purpose | Planned_Departure_Date | Arrival_Date | Passengers | Organization | Department | Journey_ID |
|---|---|---|---|---|---|---|---|---|---|---|---|---|---|---|
| 311 → | Active | ZDR012 | 0501234567 | GT-57 | Routine | 2/8/2021 13:07 | | Inspection at DPC-99552 | 2/8/2021 13:10 | 2/8/2021 19:00 | JOHN K | 30020951 | 30002138 | 8484 |
| | Delayed by One Hour at 2/8/2021 20:01 | | | | | | | | | | | | | |
| | Status | Driver_ID | Mobile | Vehicle_ID | Type | Actual_Start_Date | Completion_Date | Purpose | Planned_Departure_Date | Arrival_Date | Passengers | Organization | Department | Journey_ID |
| 312 → | Late | ZDR012 | 0501234567 | GT-57 | Routine | 2/8/2021 13:07 | | Inspection at DPC-99552 | 2/8/2021 13:10 | 2/8/2021 19:00 | JOHN K | 30020951 | 30002138 | 8484 |
| | Delayed by Two Hours at 2/8/2021 21:01 | | | | | | | | | | | | | |
| | Status | Driver_ID | Mobile | Vehicle_ID | Type | Actual_Start_Date | Completion_Date | Purpose | Planned_Departure_Date | Arrival_Date | Passengers | Organization | Department | Journey_ID |
| 313 → | Late | ZDR012 | 0501234567 | GT-57 | Routine | 2/8/2021 13:07 | | Inspection at DPC-99552 | 2/8/2021 13:10 | 2/8/2021 19:00 | JOHN K | 30020951 | 30002138 | 8484 |
| | Delayed by Three Hours at 2/8/2021 22:01 (SOS Status) | | | | | | | | | | | | | |
| | Status | Driver_ID | Mobile | Vehicle_ID | Type | Actual_Start_Date | Completion_Date | Purpose | Planned_Departure_Date | Arrival_Date | Passengers | Organization | Department | Journey_ID |
| 314 → | SOS | ZDR012 | 0501234567 | GT-57 | Routine | 2/8/2021 13:07 | | Inspection at DPC-99552 | 2/8/2021 13:10 | 2/8/2021 19:00 | JOHN K | 30020951 | 30002138 | 8484 |

FIG. 3C

AUTO-NOTIFICATION AND ESCALATION ENGINE FOR JOURNEY MANAGEMENT

BACKGROUND

Journey management refers to a planned and systematic process of reducing transportation related risks within a company's operations. The objectives of journey management include minimizing unnecessary trips, distances driven, and the risks associated with necessary trips.

A geographic information system (GIS) is a computer system for capturing, storing, checking, and displaying data related to positions on Earth's surface. GIS can show many different kinds of data on one map, such as streets, buildings, cities, landmarks, company assets, major facilities, blackspots (areas with no GSM coverage) and vegetation. This enables people to more easily see, analyze, and understand patterns and relationships. Geographical Information Systems (GISs) are currently used for geospatial location analysis to evaluate assets and points of interest in an area of interest.

SUMMARY

In general, in one aspect, the invention relates to a method for journey management. The method includes retrieving, from a geographical information system (GIS), journeyer contact information and scheduled check-in time of a journeyer who is dispatched on a journey, determining, based on a current time, a tiered late check-in status of the journeyer with respect to the scheduled check-in time, identifying, based on the tiered late check-in status, a notification entity, retrieving, from the GIS, notification contact information of the notification entity, and sending, based on the journeyer contact information and the notification contact information, an alert to the journeyer and the notification entity.

In general, in one aspect, the invention relates to a system for journey management. The system includes a processor and a memory coupled to the processor and storing instructions. The instructions, when executed by the processor, includes functionality for retrieving, from a geographical information system (GIS), journeyer contact information and scheduled check-in time of a journeyer who is dispatched on a journey, determining, based on a current time, a tiered late check-in status of the journeyer with respect to the scheduled check-in time, identifying, based on the tiered late check-in status, a notification entity, retrieving, from the GIS, notification contact information of the notification entity, and sending, based on the journeyer contact information and the notification contact information, an alert to the journeyer and the notification entity.

In general, in one aspect, the invention relates to a geographic information system (GIS) for journey management. The GIS system includes a processor and a memory coupled to the processor and storing a layered data records having a journey data record layer, a street data record layer, a buildings data record layer, a vegetation data record layer, and an integrated data record layer. The memory further storing instructions, the instructions, when executed by the processor, include functionality for providing, from the journey data record layer and to an automatic notification and escalation engine, journeyer contact information of a journeyer who is dispatched on a journey, scheduled check-in time of the journeyer, and notification contact information of a notification entity of the journeyer. The automatic notification and escalation engine requests, from the GIS, journeyer contact information and scheduled check-in time of the journeyer, determines, based on a current time, a tiered late check-in status of the journeyer with respect to the scheduled check-in time, identifies, based on the tiered late check-in status, the notification entity, requests, from the GIS, the notification contact information of the notification entity, and sends, based on the journeyer contact information and the notification contact information, an alert to the journeyer and the notification entity.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A, 3B, 3C, and 3D show an example in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a journey management method and a geographic information system for auto-notification and escalation of tiered late check-in status. In one or more embodiments of the invention, journeyer contact information and scheduled check-in time of a journeyer dispatched on a journey are retrieved from a geographical information system (GIS). A tiered late check-in status of the journeyer with respect to the scheduled check-in time is then determined based on a current time. Accordingly, a notification entity is identified based on the tiered late check-in status, and notification contact information of the notification entity is retrieved from the GIS. Based on the journeyer contact information and the notification contact information, an alert is sent to the journeyer and the notification entity. In one or more embodiments, spatial analysis is performed using an automatic vehicle locator (AVL) system to identify a last known position of the journeyer. Based on the last known position of the journeyer and from the GIS, contact information of an emergency control center (ECC) is retrieved. An emergency assistance request that is sent to the ECC to initiate a search and rescue operation of the journeyer.

Figure 1:
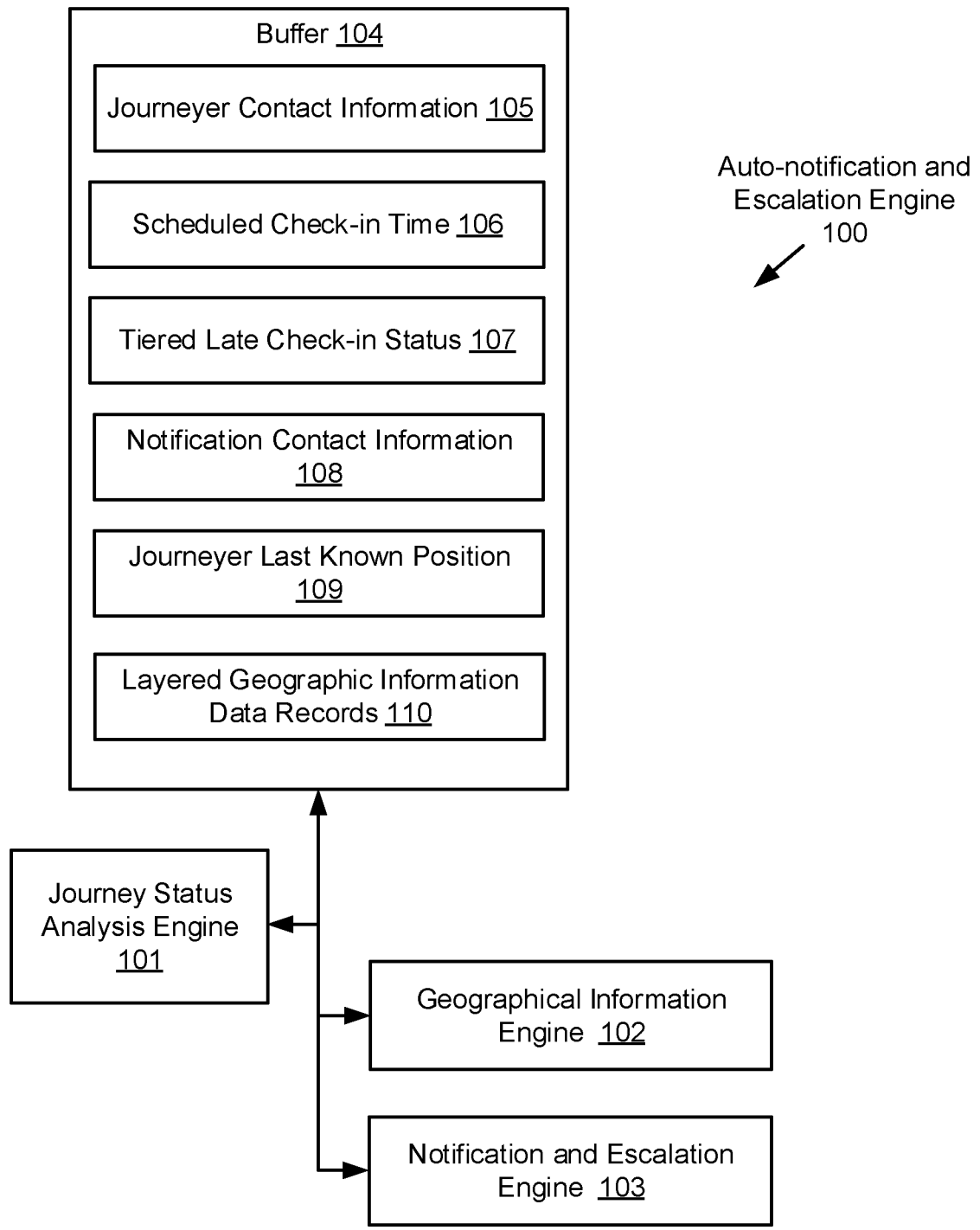
FIG. 1 shows a system in accordance with one or more embodiments.

FIG. 1 shows a schematic diagram of an auto-notification and escalation engine in accordance with one or more embodiments. In one or more embodiments, one or more of the modules and/or elements shown in FIG. 1 may be omitted, repeated, and/or substituted. Accordingly, embodiments disclosed herein should not be considered limited to the specific arrangements of modules and/or elements shown in FIG. 1.

The auto-notification and escalation engine (100) may be a process that runs in the background of a computer system such as a GIS system. As shown in FIG. 1, the auto-notification and escalation engine (100) has multiple components, including, for example, a buffer (104), a journey status analysis engine (101), a geographical information engine (102), and a notification and escalation engine (103). Each of these components (101, 102, 103, 104) may be located and executed on a same computing device (e.g., a general purpose personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components of the auto-notification and escalation engine (100) is discussed below.

In one or more embodiments of the invention, the buffer (104) may be implemented in hardware (i.e., circuitry), software, or any combination thereof. The buffer (104) is configured to store data generated and/or used by the auto-notification and escalation engine (100). The data stored in the buffer (104) includes journeyer contact information (105), scheduled check-in time (106), tiered late check-in status (107), notification contact information (108), journeyer last known position (109) and layered geographical information data records (110).

The journeyer contact information (105) is contact information of a journeyer who is dispatched on a journey. For example, the journeyer may be traveling to a remote location by a car, train, airplane, or any other mode of transportation. The journeyer may be an employee of a business entity that is dispatched by a travel instruction/assignment from the business entity. In one or more embodiments, a journey is a trip for the journeyer to travel in a remote area with certain risks and is monitored using the auto-notification and escalation engine (100). For example, the journeyer contact information (105) may include mobile phone number, email address, etc. of the journeyer.

The scheduled check-in time (106) is a time scheduled for the journeyer to send trip status during the journey to the auto-notification and escalation engine (100). In particular, a journey may include one or more scheduled check-in time.

The tiered late check-in status (107) is an automatically generated trip status when the journeyer fails to send any trip status according to the scheduled check-in time, such as the scheduled check-in time (106). In one or more embodiments, the tiered late check-in status (107) includes a first tier late check-in status, a second tier late check-in status, and a third tier late check-in status that correspond to the journeyer being late for check-in by at least a late threshold (e.g., one hour), an extended late threshold (e.g., two hours), and an emergency late threshold (e.g., three hours), respectively, past the scheduled check-in time (106). The late threshold, extended late threshold, and emergency late threshold are pre-determined tiered delay periods.

The notification contact information (108) is contact information of a notification entity of the journeyer. In one or more embodiments, the notification entity includes one or more of a journey management personnel (e.g., a journey management coordinator), an extended journey management personnel (e.g., a supervisor of the journeyer), and an emergency journey management personnel (e.g., an emergency control center personnel), For example, the notification contact information (108) may include mobile phone number, email address, etc. of the notification entity.

The journeyer last known position (109) is a geographical position where the journeyer has sent the most recent check-in to the auto-notification and escalation engine (100).

The journeyer contact information (105), scheduled check-in time (106), tiered late check-in status (107), notification contact information (108), and journeyer last known position (109) are collectively referred to as a journey management data record. More than one journey management data record may be stored in the buffer (104). Layered on top of the journey management data record(s), the layered geographic information data records (110) include additional data records related to positions on Earth's surface, such as streets, buildings, cities, landmarks, company assets, major facilities, blackspots (areas with no GSM coverage), vegetation, and other geographical and/or terrain features. Within the buffer (104), the layered geographic information data records (110) are stored as horizontal layers where each layer corresponds to a specific geographical or terrain feature that is correlated to geographical positions associated with the journey management data record(s).

In one or more embodiments, the journey status analysis engine (101), the geographical information engine (102), and the notification and escalation engine (103) may be implemented in hardware (i.e., circuitry), software, or any combination thereof.

In one or more embodiments, the journey status analysis engine (101) is configured to generate tiered late check-in status (107) based at least on the scheduled check-in time (106).

In one or more embodiments, the geographical information engine (202) is configured to provide journey related information from the layered data records stored in the buffer (104).

In one or more embodiments, the notification and escalation engine (103) is configured to generate and send an alert based on the tiered late check-in status to one or more of the journeyer and the notification entity described above.

In one or more embodiments, the auto-notification and escalation engine (100) performs the functionalities described above using the method described in reference to FIG. 2 below. Although the auto-notification and escalation engine (100) is shown as having three engines (101, 102, 103), in other embodiments of the invention, the auto-notification and escalation engine (100) may have more or fewer engines and/or more or fewer other components. Further, the functionality of each component described above may be split across components. Further still, each component (101, 102, 103) may be utilized multiple times to carry out an iterative operation.

Figure 2:
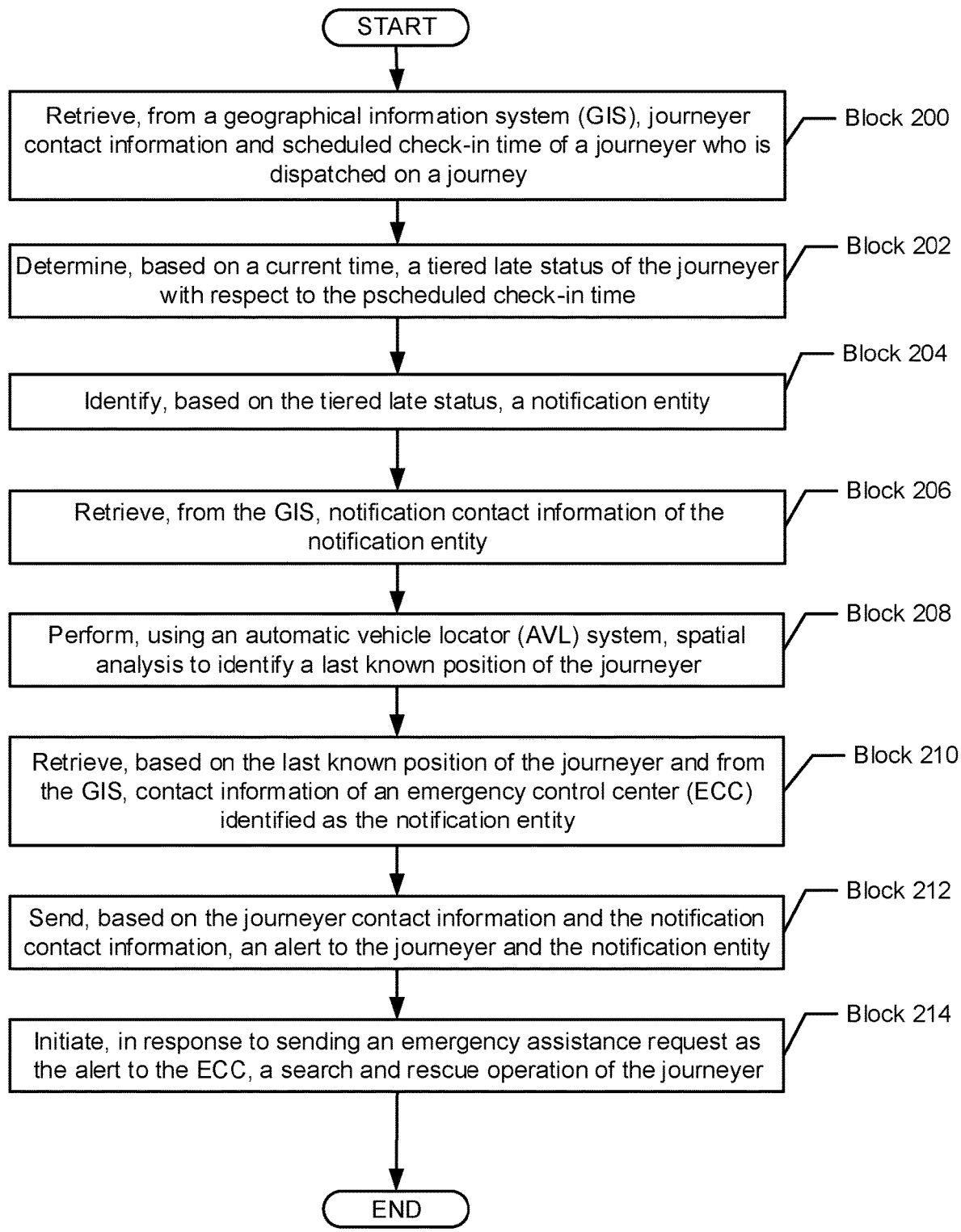
FIG. 2 shows a flowchart in accordance with one or more embodiments.

Turning to FIG. 2, FIG. 2 shows a flowchart in accordance with one or more embodiments. Specifically, FIG. 2 describes a method of automatic notification and escalation for journey management. One or more blocks in FIG. 2 may be performed using one or more components as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 200, journeyer contact information and scheduled check-in time of a journeyer are retrieved from a geographical information system (GIS).

In Block 202, a tiered late check-in status of the journeyer with respect to the scheduled check-in time is determined based on a current time.

In Block 204, a notification entity is identified based on the tiered late check-in status.

In Block 206, notification contact information of the notification entity is retrieved from the GIS.

In Block 208, spatial analysis is performed using an automatic vehicle locator (AVL) system to identify a last known position of the journeyer. In one or more embodiments, the spatial analysis is initiated in response to a third tier late check-in status.

Spatial analysis is a computer-performed task to solve complex location based problems, find patterns, assess trends, and make decisions. Spatial analysis includes traditional mapping and further allows to study the characteristics of places and the relationships among them. Using spatial analysis we can combine information from many data sources and derive new information by applying a set of spatial operators. For example, the spatial operator "find nearest" feature is used based on the SOS event (third tier escalation) location. Using the "find nearest" feature of the spatial analysis, the nearest emergency control center (ECC) is determined once the last known position is retrieved from the AVL system or identified to be the driver's mobile location. The spatial analysis function is also utilized to find shortest route from the ECC location to the last known position of the journeyer.

In Block 210, contact information of a nearest emergency control center (ECC) is retrieved from the GIS based on the last known position of the journeyer. In one or more embodiments, the nearest ECC is identified in response to the third tier late check-in status.

In Block 212, an alert is sent to the journeyer and the notification entity based on the journeyer contact information and the notification contact information. The alert may be an electronic message, such as a text message, a computer generated voice phone message, etc.

In Block 214, a search and rescue operation of the journeyer is initiated in response to an emergency alert, such as an emergency assistance request sent to the ECC. In one or more embodiments, the search and rescue operation is initiated in response to the third tier late check-in status.

Turning to FIGS. 3A-3D, FIGS. 3A-3D provide an example of the auto-notification and escalation engine for journey management. The example shown in FIGS. 3A-3D may be, for example, based on one or more components depicted in FIG. 1 and the method flowchart depicted in FIG. 2 above. In one or more embodiments, one or more of the modules and/or elements shown in FIGS. 3A-3D may be omitted, repeated, and/or substituted. Accordingly, embodiments disclosed herein should not be considered limited to the specific arrangements of modules and/or elements shown in FIGS. 3A-3D.

The example shown in FIGS. 3A-3D is related to the automation for journey management processes for handling risks, delays and emergency situations of a journeyer during remote area trips. The auto-notification and escalation engine handles different scenarios, notifies and escalates delays and emergency situations to the designated authorities/management according to location-based analysis results, which in turn ensures faster response for search and rescue operations, especially for situations related to remote area journeys. In the example below, the journeyer is referred to as a driver of a land-based trip.

Figure 3A:
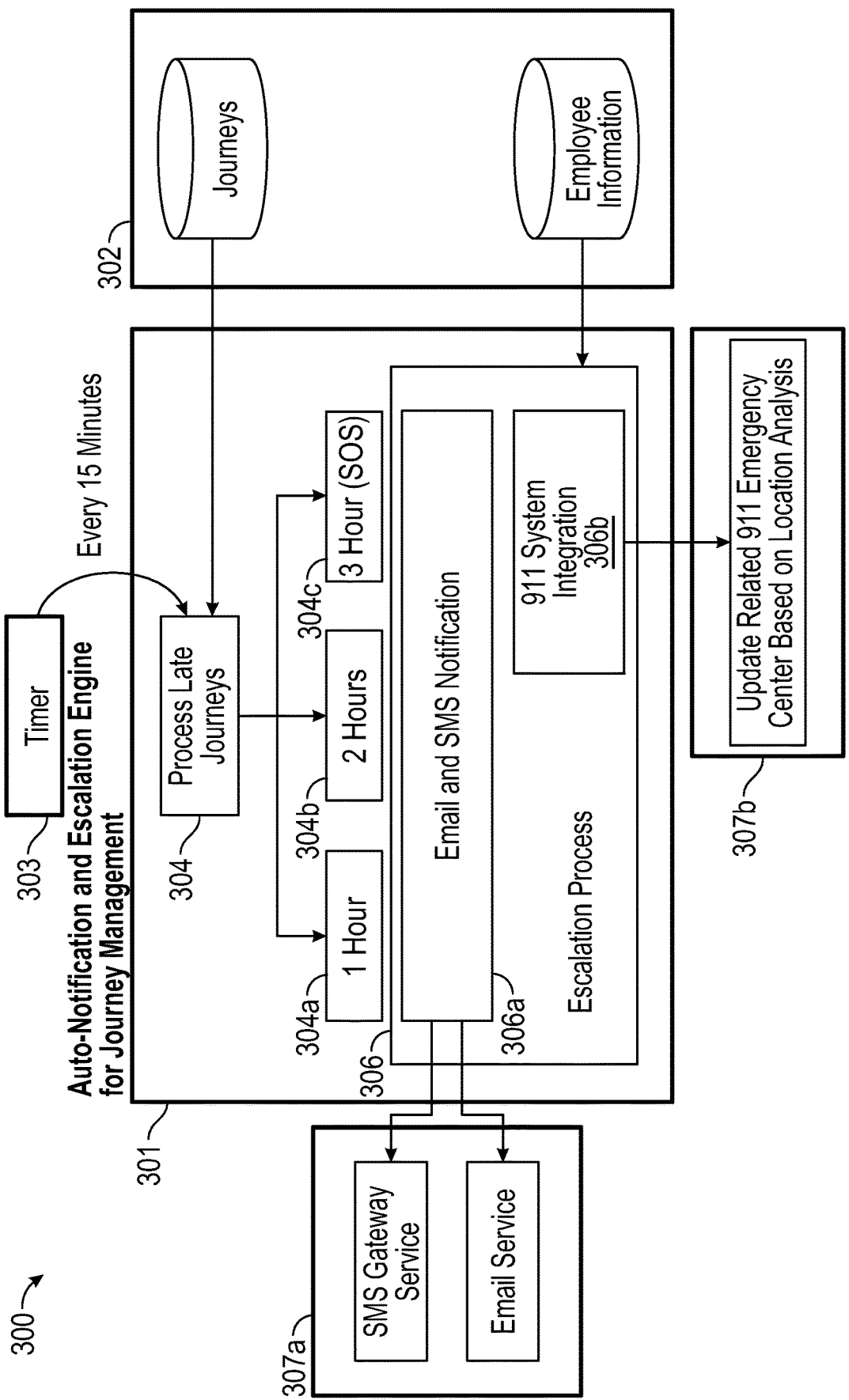

FIG. 3A shows an example workflow (300) of the auto-notification and escalation engine (301) for journey management. The workflow (300) is a set of background processes described below that are performed on regular intervals. For example, the background processes may be executed on the auto-notification and escalation engine (100) depicted in FIG. 1 above.

On a regular basis, all active journeys at a given time are retrieved from a data repository (302) as triggered by a timer (303) to perform late journey process (304). The retrieved journeys are processed for one-hour late check (304*a*). Specifically, it is checked if any journey is already late by an hour. If yes, alert the driver, identify the driver's immediate superior and his organization's journey management coordinator. In addition, SMS and email notification (306*a*) are generated via the escalation process (306) and communication service (307*a*) to driver's superior and to anyone in the particular organization with journey management coordinator role.

The retrieved journeys are processed for two hours late check (304*b*). Specifically, it is checked if any journey is already late by 2 hours. If yes, alert the driver, identify the driver's immediate superior and his organization's journey management coordinator. In addition, SMS and email notification (306*a*) are generated via the escalation process (306) and communication service (307*a*) to driver's superior and to anyone in the particular organization with journey management coordinator role.

The retrieved journeys are processed for SOS status (304*c*). Specifically, it is checked if any journey is already late by 3 hours. If yes, identify the driver's immediate superior and his organization's journey management coordinator. In addition, SMS and email notification (306*a*) are generated via the escalation process (306) and communication service (307*a*) to driver's superior and to anyone in the particular organization with journey management coordinator role. In addition, spatial analysis is performed to identify the last known position of the driver's mobile device and vehicle position (from an automatic vehicle locator (AVL) system) and to determine the nearest or designated 911 Emergency Control Center (ECC) (307*b*). Accordingly, emergency assistance request (SOS) email notification is generated via the 911 system integration interface (306*b*) to the identified 911 Emergency Control Center (ECC) (307*b*). In parallel, a new Emergency Incident is pushed via the escalation process (306) into the software used by ECCs with all details of the journey, driver, vehicle ID, last known positions, etc. to initiate the secondary search and rescue operations.

Figure 3B:
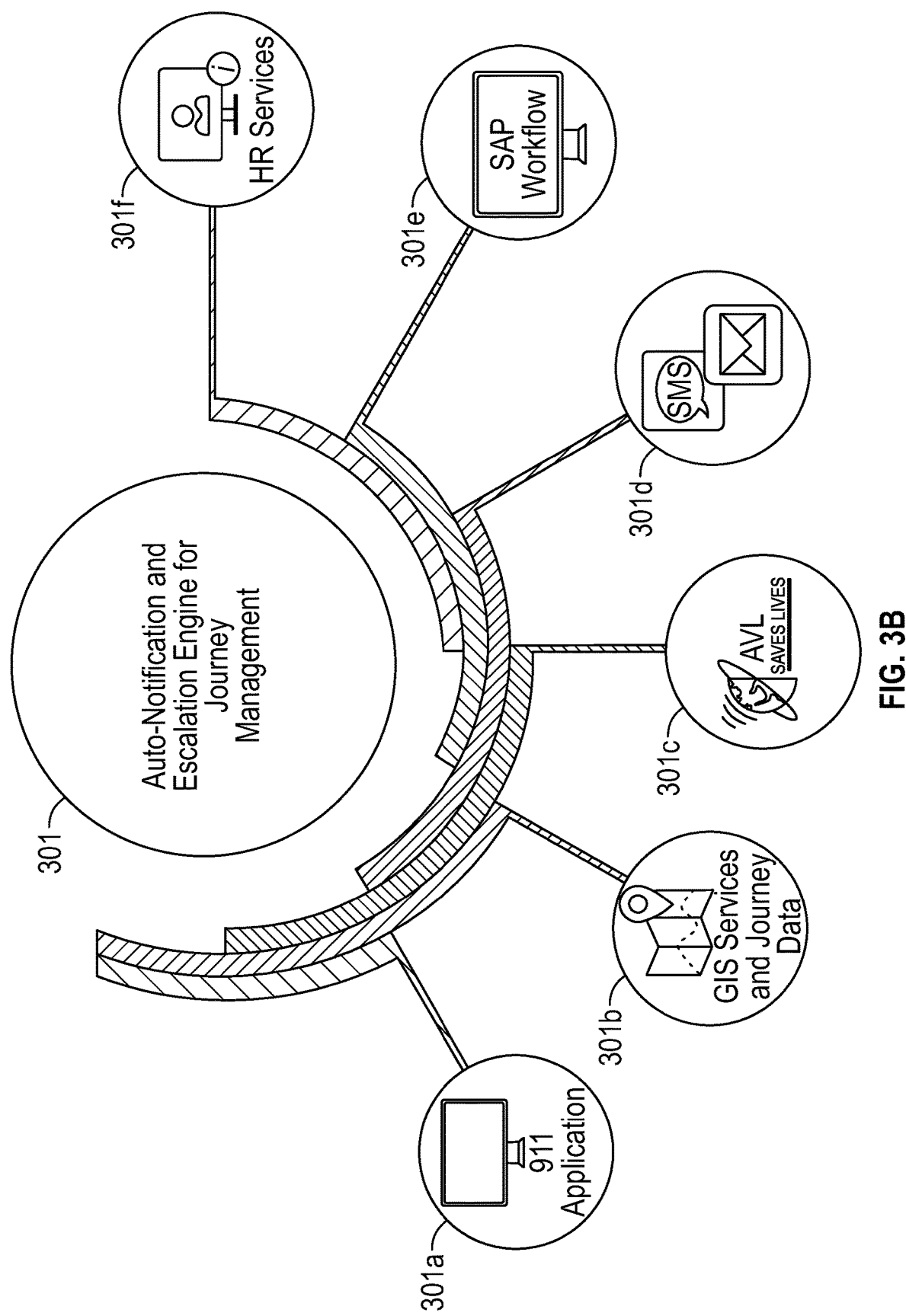

The contact information of the driver, immediate supervisor, and journey management coordinator is retrieved from the data repository (302). Example application interfaces of the auto-notification and escalation engine (301) for journey management are shown in FIG. 3B where the application interface includes interface A (301*a*), interface B (301*b*), interface C (301*c*), interface D (301*d*), interface E (301*e*), and interface F (301*f*) that are used for communicating with the ECC application, GIS services, AVL system, simple messaging system (SMS) services, SAP workflow system, and human resource (HR) services system, respectively. For example, the HR services system provides employee information regarding the driver, immediate supervisor, and journey management coordinator of an active journey retrieved from the journey data records. Example active journey data records are shown in FIG. 3C where journey data record A (311) corresponds to an active journey, journey data record B (312) corresponds to a journey delayed by one hour, journey data record C (313) corresponds to a journey delayed by two hours, and journey data record D (314) corresponds to a journey delayed by three hours that has triggered an emergency assistance request (SOS) notification.

Figure 3D:
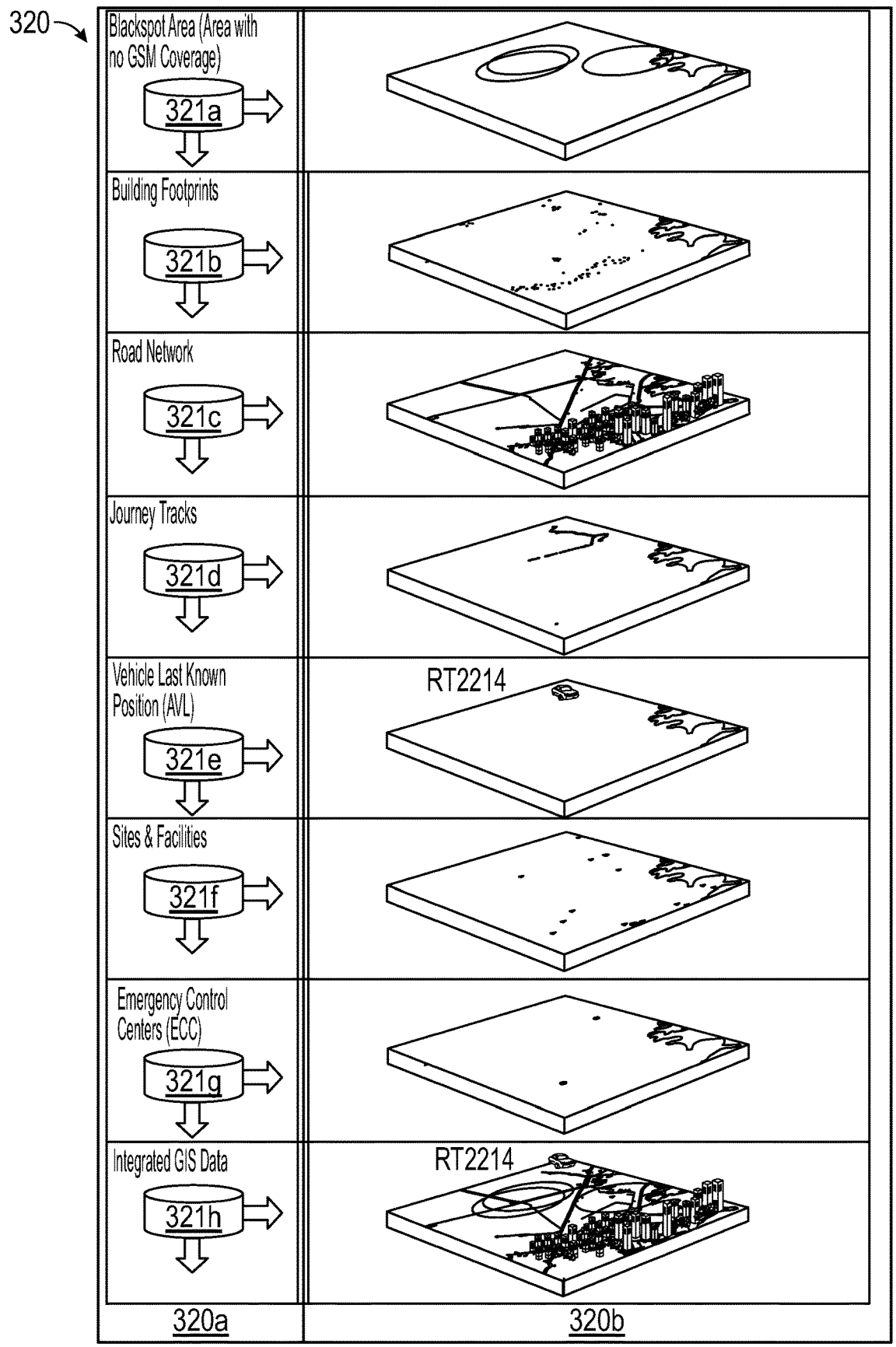

FIG. 3D shows an GIS data organization (320) of the auto-notification and escalation engine (301) for journey management. As shown in FIG. 3D, the GIS data organization (320) blackspot area data (321a), building footprint data (321b), road network data (321c), journey tracks data (321d), vehicle last known position data (321e), sites and facilities data (3210, Emergency Control Centers data (321g), and integrated GIS data (321h) that are organized in an layered data structure (320b). The blackspot area data (321a), journey tracks data (321d), vehicle last known position data (321e), and Emergency Control Centers data (321g) collectively form an aggregate layer referred to as a journey data record layer. The layered data structure (320b) may be displayed or otherwise utilized by the geographic information system (GIS) to show many different kinds of data on a single map, such as journey route and status, streets, buildings, cities, landmarks, company assets, major facilities, blackspots (areas with no GSM coverage) and vegetation. This enables the driver's immediate superior and his organization's journey management coordinator to more easily visualize, analyze, and understand patterns and relationships. Accordingly, the geographic information system (GIS) with integrated journey data enables smart background process for monitoring all journeys based on set intervals, triggering notifications to specific user organizations and recipients when certain events occur, initiating automatic escalation to 911 Emergency Control Centers (ECC) after a preset time period (e.g., 3 hours), auto-generating emails with last known position of the driver's mobile location or vehicle to narrow down the search and rescue locations.

Embodiments disclosed herein provide the following advantages: (1) automatically identifying potential delays while journeys are under progress, (2) effectively managing and monitoring safety of the company workforce during remote area trips, (3) reducing response time for secondary search and rescue, and (4) providing a corporate level end-to-end solution applicable to different organizations thus eliminating disjoint journey management practices.

Figure 4:
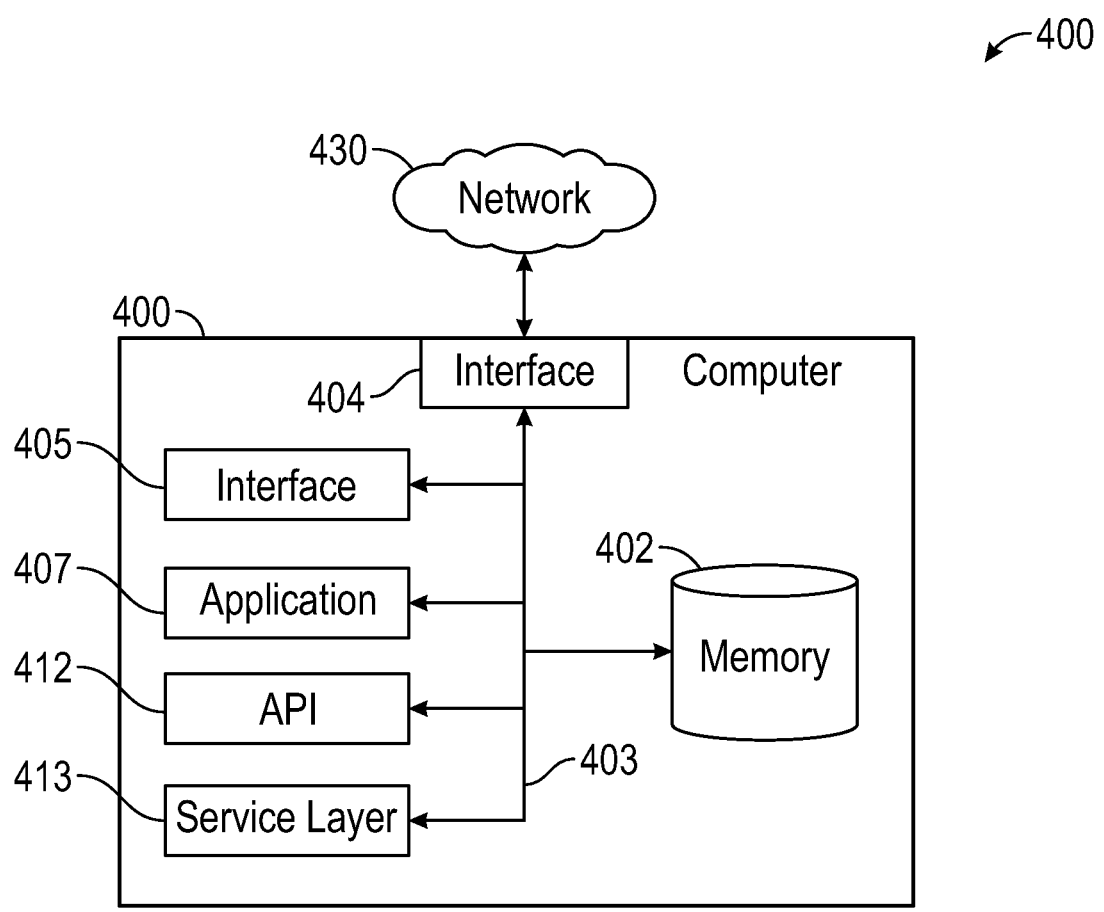
FIG. 4 show a computing system in accordance with one or more embodiments.

Embodiments disclosed herein may be implemented on a computer system. FIG. 4 is a block diagram of a computer system (400) used to provide computational functionalities associated with described algorithms, methods, functions, processes, flows, and procedures as described in the instant disclosure, according to an implementation. The illustrated computer (400) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (400) may include a computer that includes an input device, such as a keypad, keyboard, touch screen, or other device that can accept user information, and an output device that conveys information associated with the operation of the computer (400), including digital data, visual, or audio information (or a combination of information), or a GUI.

The computer (400) can serve in a role as a client, network component, a server, a database or other persistency, or any other component (or a combination of roles) of a computer system for performing the subject matter described in the instant disclosure. The illustrated computer (400) is communicably coupled with a network (430). In some implementations, one or more components of the computer (400) may be configured to operate within environments, including cloud-computing-based, local, global, or other environment (or a combination of environments).

At a high level, the computer (400) is an electronic computing device operable to receive, transmit, process, store, or manage data and information associated with the described subject matter. According to some implementations, the computer (400) may also include or be communicably coupled with an application server, e-mail server, web server, caching server, streaming data server, business intelligence (BI) server, or other server (or a combination of servers).

The computer (400) can receive requests over network (430) from a client application (for example, executing on another computer (400)) and responding to the received requests by processing the said requests in an appropriate software application. In addition, requests may also be sent to the computer (400) from internal users (for example, from a command console or by other appropriate access method), external or third-parties, other automated applications, as well as any other appropriate entities, individuals, systems, or computers.

Each of the components of the computer (400) can communicate using a system bus (403). In some implementations, any or all of the components of the computer (400), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (400) or other components (whether or not illustrated) that are communicably coupled to the computer (400). The functionality of the computer (400) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format, JSON or other suitable format. While illustrated as an integrated component of the computer (400), alternative implementations may illustrate the API (412) or the service layer (413) as stand-alone components in relation to other components of the computer (400) or other components (whether or not illustrated) that are communicably coupled to the computer (400). Moreover, any or all parts of the API (412) or the service layer (413) may be implemented as child or sub-modules of another software module, enterprise application, or hardware module without departing from the scope of this disclosure.

The computer (400) includes an interface (404). Although illustrated as a single interface (404) in FIG. 4, two or more interfaces (404) may be used according to particular needs, desires, or particular implementations of the computer (400). The interface (404) is used by the computer (400) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (400).

The computer (400) includes at least one computer processor (405). Although illustrated as a single computer processor (405) in FIG. 4, two or more processors may be used according to particular needs, desires, or particular implementations of the computer (400). Generally, the computer processor (405) executes instructions and manipulates data to perform the operations of the computer (400) and any algorithms, methods, functions, processes, flows, and procedures as described in the instant disclosure.

The computer (400) also includes a memory (406) that holds data for the computer (400) or other components (or a combination of both) that may be connected to the network (430). For example, memory (406) may be a database storing data consistent with this disclosure. Although illustrated as a single memory (406) in FIG. 4, two or more memories may be used according to particular needs, desires, or particular implementations of the computer (400) and the described functionality. While memory (406) is illustrated as an integral component of the computer (400), in alternative implementations, memory (406) may be external to the computer (400).

The application (407) is an algorithmic software engine providing functionality according to particular needs, desires, or particular implementations of the computer (400), particularly with respect to functionality described in this disclosure. For example, application (407) can serve as one or more components, modules, applications, etc. Further, although illustrated as a single application (407), the application (407) may be implemented as multiple applications (407) on the computer (400). In addition, although illustrated as integral to the computer (400), in alternative implementations, the application (407) may be external to the computer (400).

There may be any number of computers (400) associated with, or external to, a computer system containing computer (400), each computer (400) communicating over network (430). Further, the term "client," "user," and other appropriate terminology may be used interchangeably as appropriate without departing from the scope of this disclosure. Moreover, this disclosure contemplates that many users may use one computer (400), or that one user may use multiple computers (400).

In some embodiments, the computer (400) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

What is claimed is:

1. A method for journey management, the method comprising:
    retrieving, from a geographical information system (GIS), journeyer contact information and scheduled check-in time of a journeyer who is dispatched on a journey;
    determining, based on a current time, a tiered late check-in status of the journeyer with respect to the scheduled check-in time;
    identifying, using an automatic vehicle locator (AVL) system and based on the tiered late check-in status, a last known position of the journeyer where the journeyer has sent a most recent check-in to a journey management system;
    retrieving, based on the last known position of the journeyer and from the GIS, notification contact information of a notification entity, wherein the notification entity comprises a nearest emergency control center (ECC) to the last known position of the journeyer;
    sending, based on the journeyer contact information and the notification contact information, an alert to the journeyer and the nearest ECC; and
    performing, in response to sending the alert to the nearest ECC, a search and rescue operation of the journeyer.

2. The method according to claim 1,
    wherein the tiered late check-in status corresponds to failure to receive check-in from the journeyer at the current time exceeding a late threshold or an extended late threshold with respect to the scheduled check-in time, and
    wherein the notification contact information comprises electronic contact information of a journey management personnel or an escalated journey management personnel.

3. The method according to claim 1,
    wherein the tiered late check-in status corresponds to failure to receive check-in from the journeyer at the current time exceeding an emergency late threshold with respect to the scheduled check-in time, and
    wherein the notification contact information comprises electronic contact information of an emergency journey management personnel.

4. The method according to claim 3, further comprising:
    performing, using the AVL system, spatial analysis to identify the last known position of the journeyer,
    wherein the alert comprises an emergency assistance request with the last known position of the journeyer that is sent to the nearest ECC, and
    wherein said identifying the last known position of the journeyer is prior to said sending the alert to the nearest ECC.

5. The method according to claim 4, further comprising:
    initiating, in response to sending the emergency assistance request to the nearest ECC, the search and rescue operation of the journeyer.

6. The method according to claim 5,
wherein the alert is sent via an application interface of an automatic notification and escalation engine for an electronic messaging application and an ECC application.

7. The method according to claim 1,
wherein the journeyer contact information, the scheduled check-in time, and the notification contact information are retrieved via an application interface of an automatic notification and escalation engine for the GIS.

8. A system for journey management, comprising:
a processor; and
a memory coupled to the processor and storing instructions, the instructions, when executed by the processor, comprising functionality for:
retrieving, from a geographical information system (GIS), journeyer contact information and scheduled check-in time of a journeyer who is dispatched on a journey;
determining, based on a current time, a tiered late check-in status of the journeyer with respect to the scheduled check-in time;
identifying, using an automatic vehicle locator (AVL) system and based on the tiered late check-in status, a last known position of the journeyer where the journeyer has sent a most recent check-in to a journey management system;
retrieving, based on the last known position of the journeyer and from the GIS, notification contact information of a notification entity, wherein the notification entity comprises a nearest emergency control center (ECC) to the last known position of the journeyer;
sending, based on the journeyer contact information and the notification contact information, an alert to the journeyer and the nearest ECC; and
performing, in response to sending the alert to the nearest ECC, a search and rescue operation of the journeyer.

9. The system according to claim 8,
wherein the tiered late check-in status corresponds to failure to receive check-in from the journeyer at the current time exceeding a late threshold or an extended late threshold with respect to the scheduled check-in time, and
wherein the notification contact information comprises electronic contact information of a journey management personnel or an escalated journey management personnel.

10. The system according to claim 8,
wherein the tiered late check-in status corresponds to failure to receive check-in from the journeyer at the current time exceeding an emergency late threshold with respect to the scheduled check-in time, and
wherein the notification contact information comprises electronic contact information of an emergency journey management personnel.

11. The system according to claim 10, the instructions, when executed by the processor, comprising functionality for:
performing, using the AVL system, spatial analysis to identify the last known position of the journeyer,
wherein the alert comprises an emergency assistance request with the last known position of the journeyer that is sent to the nearest ECC, and
wherein said identifying the last known position of the journeyer is prior to said sending the alert to the nearest ECC.

12. The system according to claim 11, the instructions, when executed by the processor, comprising functionality for:
initiating, in response to sending the emergency assistance request to the nearest ECC, the search and rescue operation of the journeyer.

13. The system according to claim 12,
wherein the alert is sent via an application interface of an automatic notification and escalation engine for an electronic messaging application and an ECC application.

14. The system according to claim 8,
wherein the journeyer contact information, the scheduled check-in time, and the notification contact information are retrieved via an application interface of an automatic notification and escalation engine for the GIS.

15. A geographic information system (GIS) for journey management, comprising:
a processor; and
a memory coupled to the processor and storing a layered data records comprising a journey data record layer, a street data record layer, a buildings data record layer, a vegetation data record layer, and an integrated data record layer,
the memory further storing instructions, the instructions, when executed by the processor, comprising functionality for:
providing, from the journey data record layer and to an automatic notification and escalation engine, journeyer contact information of a journeyer who is dispatched on a journey, scheduled check-in time of the journeyer, and notification contact information of a notification entity of the journeyer;
wherein the automatic notification and escalation engine
requests, from the GIS, journeyer contact information and scheduled check-in time of the journeyer,
determines, based on a current time, a tiered late check-in status of the journeyer with respect to the scheduled check-in time,
identifies, using an automatic vehicle locator (AVL) system and based on the tiered late check-in status, a last known position of the journeyer where the journeyer has sent a most recent check-in to a journey management system,
requests, based on the last known position of the journeyer and from the GIS, notification contact information of a notification entity, wherein the notification entity comprises a nearest emergency control center (ECC) to the last known position of the journeyer;
sends, based on the journeyer contact information and the notification contact information, an alert to the journeyer and the nearest ECC; and
performs, in response to sending the alert to the nearest ECC, a search and rescue operation of the journeyer.

16. The GIS according to claim 15,
wherein the tiered late check-in status corresponds to failure to receive check-in from the journeyer at the current time exceeding a late threshold or an extended late threshold with respect to the scheduled check-in time, and wherein the notification contact information comprises electronic contact information of a journey management personnel or an escalated journey management personnel.

17. The GIS according to claim 15,
wherein the tiered late check-in status corresponds to failure to receive check-in from the journeyer at the current time exceeding an emergency late threshold with respect to the scheduled check-in time, and
wherein the notification contact information comprises electronic contact information of an emergency journey management personnel.

18. The GIS according to claim 17, the instructions, when executed by the processor, comprising functionality for:
providing, from the journey data record layer and to the automatic notification and escalation engine, contact information of an emergency control center (ECC) nearest to a last known position of the journeyer,
wherein the automatic notification and escalation engine further performs, using the AVL system, spatial analysis to identify the last known position of the journeyer
wherein the alert comprises an emergency assistance request with the last known position of the journeyer that is sent to the nearest ECC, and
wherein said identifying the last known position of the journeyer is prior to said sending the alert to the nearest ECC.

19. The GIS according to claim 18,
wherein the automatic notification and escalation engine further initiates, in response to sending the emergency assistance request to the nearest the search and rescue operation of the journeyer.

20. The GIS according to claim 19,
wherein the alert is sent via an application interface of the automatic notification and escalation engine for an electronic messaging application and an ECC application.

* * * * *